Figure 1:
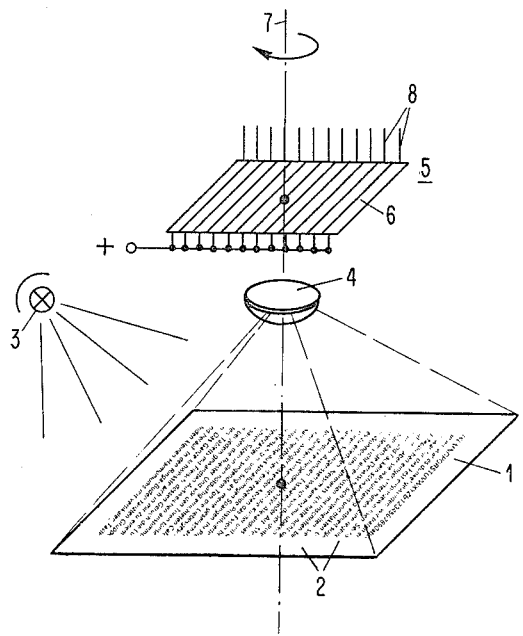

United States Patent [19]

Chevillat et al.

[11] 4,338,588
[45] Jul. 6, 1982

[54] ARRANGEMENT FOR DETERMINING THE OPTIMUM SCAN ANGLE FOR PRINTED DOCUMENTS

[75] Inventors: Pierre Chevillat, Adliswil; Hans R. Schindler, Langnau, both of Switzerland

[73] Assignee: International Business Machines Corporation, Armonk, N.Y.

[21] Appl. No.: 155,863

[22] Filed: Jun. 2, 1980

[30] Foreign Application Priority Data

Jun. 26, 1979 [CH] Switzerland ............................ 5939/79

[51] Int. Cl.³ .................................................. G06K 9/32
[52] U.S. Cl. ............................. 340/146.3 H; 250/557; 250/561; 356/400; 356/152
[58] Field of Search .............. 340/146.3 H, 146.3 AH, 340/146.3 MA, 146.3 R; 250/202, 548, 557, 561; 356/138, 373, 399, 400, 152; 358/285

[56] References Cited

U.S. PATENT DOCUMENTS

| | | | |
|---|---|---|---|
| 3,457,422 | 7/1969 | Rottmann | 340/146.3 H |
| 3,617,751 | 11/1971 | Levy et al. | 250/202 |
| 3,701,098 | 10/1972 | Acker | 340/146.3 Z |
| 3,727,184 | 4/1973 | Roza et al. | 340/146.3 H |
| 3,774,014 | 11/1973 | Berler | 250/557 |
| 3,811,110 | 5/1974 | Inose et al. | 340/146.3 H |
| 3,820,069 | 6/1974 | Krewson et al. | 340/146.3 H |
| 3,831,146 | 8/1974 | Rundle | 340/146.3 H |
| 3,847,346 | 11/1974 | Dolch | 340/146.3 H |
| 4,097,750 | 6/1978 | Lewis et al. | 250/548 |
| 4,105,925 | 8/1978 | Rossol et al. | 250/561 |
| 4,142,105 | 2/1979 | Erdmann | 250/548 |
| 4,168,488 | 9/1979 | Evans | 340/146.3 H |
| 4,201,378 | 5/1980 | Hams | 250/561 |
| 4,238,780 | 12/1980 | Doemens | 340/146.3 H |

FOREIGN PATENT DOCUMENTS

| | | | |
|---|---|---|---|
| 54-935 | 6/1979 | Japan | 340/146.3 H |
| 2035551 | 6/1980 | United Kingdom | 340/146.3 H |

OTHER PUBLICATIONS

Allen, *IBM Tech. Disclosure Bulletin*, vol. 1, No.1, Jun. 1958, "Skew Compensator", p. 4.
Bishop et al., *IBM Tech. Disclosure Bulletin*, vol. 21, No. 9, Feb., 1979, "Character Recognition Approach Involving Histogram Classification", pp. 3461–3467.
Tersoff, *Proc. of Eastern Comp. Conf.*, 1957, "Automatic Registration in High-Speed Character Sensing Equipment", pp. 238–242.

*Primary Examiner*—Leo H. Boudreau
*Attorney, Agent, or Firm*—E. Ronald Coffman; Rosen et al., *IBM Tech. Disclosure Bulletin*, vol. 14, No. 7, Dec., 1971, "General Line Centering with Optical Video Consolidation", pp. 2201–2203.

[57] ABSTRACT

A sensor, having a plurality of parallel elongated light transducers, is rotated relative to a document to be aligned with a predetermined reference. A signal accumulated from the transducers reaches a distinct maximum when printed lines on the document are aligned with the elongated transducers. Detection of this maximum enables measurement of the angle by which the document is out of alignment.

6 Claims, 6 Drawing Figures

ARRANGEMENT FOR DETERMINING THE OPTIMUM SCAN ANGLE FOR PRINTED DOCUMENTS

The invention concerns an arrangement for the determination of the optimum scan angle of printed documents. It comprises a sensor on which the documents are projected by means of an optical system.

Such arrangements are required to determine, prior to the actual scanning of the documents, the initial more or less random position of the document relative to the scanning apparatus. The disalignment angle is then used to bring the document into an optimum position relative to the scanner before the scanning operation is initiated.

These arrangements are, e.g., employed in optical character recognition apparatus and in facsimile transmission systems where the optimum alignment is of great advantage. Either the expenditure for the scanning or character recognition equipment and the bandwidth of transmission channels that may be required can be largely reduced or, without increasing the expenditure, substantial improvements in quality and reliability can be obtained.

A variety of scanning apparatus as well as of alignment arrangements associated therewith have been designed and are, e.g., described in the following publications:

U.S. Pat. No. 3,457,422 "Optical System Adapted for Rotation of an Image to be Scanned with Reference to a Scanning Path", U.S. Pat. No. 3,831,146 "Optimum Scan Angle Determining Means", IBM Technical Disclosure Bulletin Vol. 14, No. 7 (1971), pp. 2201-2203 "General Line Centering with Optical Video Consolidation", and A. I. Tersoff's article "Automatic Registration in High-Speed Character Sensing Equipment", published in Proceedings Eastern Joint Computer Conference 1957, pp. 238-242. These known arrangements are, however, not suited for the determination of the optimum scan angle unless substantial design changes are made.

In the IBM Technical Disclosure Bulletin Vol. 1, No. 1 (1958), an article "Skew Compensator" was published disclosing an arrangement capable of determining the line direction of the document to be scanned and of automatically aligning the scanning sensors. This systems requires, however, that the documents to be scanned are provided with additional reference lines. In addition, the operation is time-consuming and the concept is not suited for scanning apparatus employing modern technology.

The invention renders it possible to avoid these disadvantages. The arrangement for determining the optimum scan angle is characterized by a sensor consisting of a plurality of parallel stripes of light-sensitive material that generate signals $S_i$ proportional to the intensity of the light reflected from the corresponding stripe-shaped sector of the document, by means for generating signals $\Delta_j$ that correspond to the difference of the signals that are provided by pairs of stripes $S_i$ and $S_{i+D}$, D being an integer and greater than one, by means for forming function values $$f(\Delta_j) = \sum_{K=0}^{N} c_K |\Delta_j^K|$$

for each of the difference signals $\Delta_j$, N and $c_K$ being predetermined constants, by means for accumulating all said function values $f(\Delta_j)$, and by means for turning the sensor and the document relative to each other.

For storing the optimum scan angle, the following means may, in addition, be provided: an angle indicator transmitting signals indicative of the angle between the sensor and a reference axis, a comparator generating a control signal whenever the amplitude of the signal provided by the accumulating means exceeds every previously reached value, and a register that is connected to the comparator and to the angle indicator and into which angle indication signals are written as long as the control signal from the comparator is present.

The main advantages accomplished by the invention may be seen in that the problem of determining the relative alignment between printed lines and the scanning direction can be solved by a rather simple, opto-mechanical arrangement and with an electronic circuitry that is also of low expenditure. The inventive arrangement furthermore permits the handling of documents that may be different with regard to the pitch, the character size, and to the length and position of the lines without requiring adjustments during the operation. The disalignment angle that can be determined is very accurate and remains available in storage until it is utilized to align the document relative to the scanning arrangement.

Figure 2:
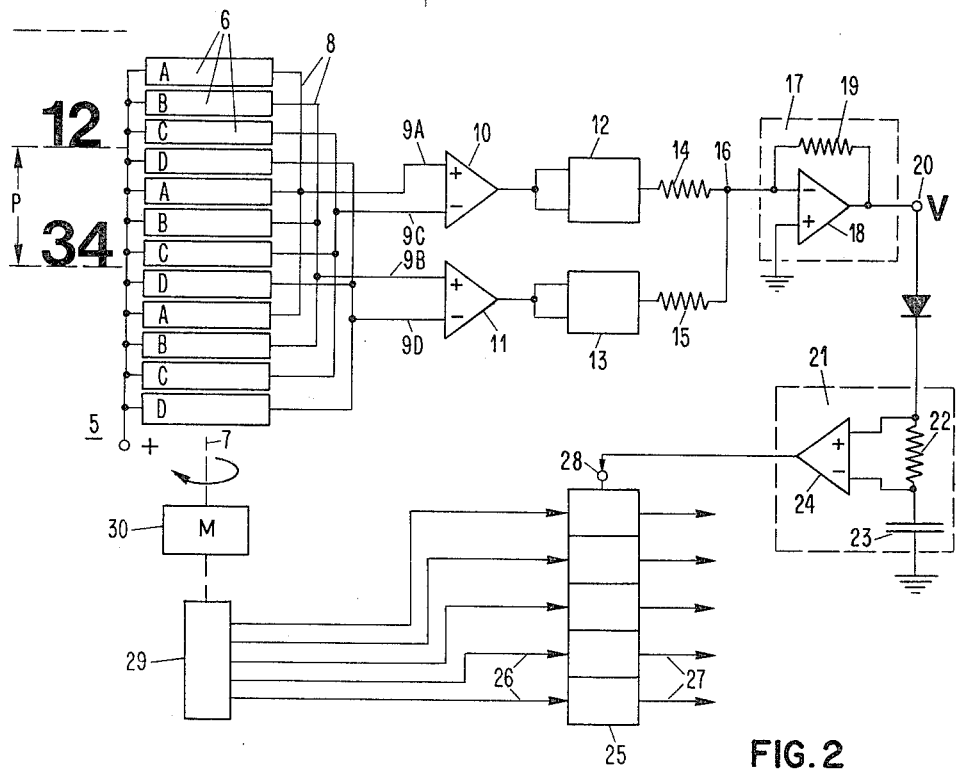
Figure 3:
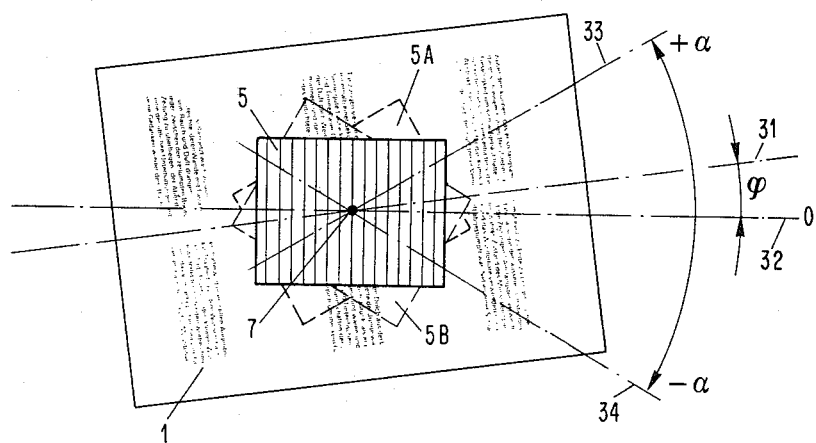
Figure 4:
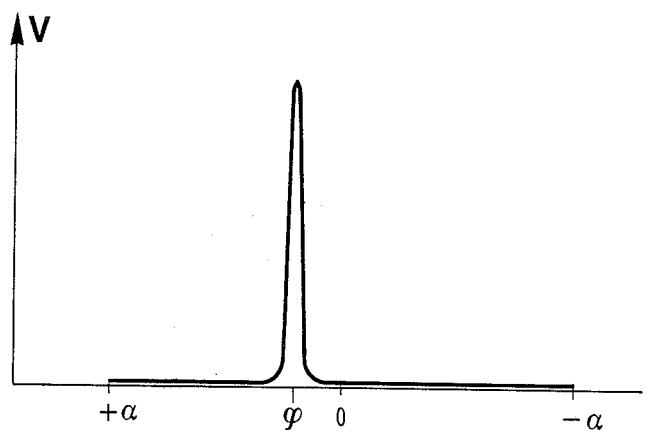
Figure 5:
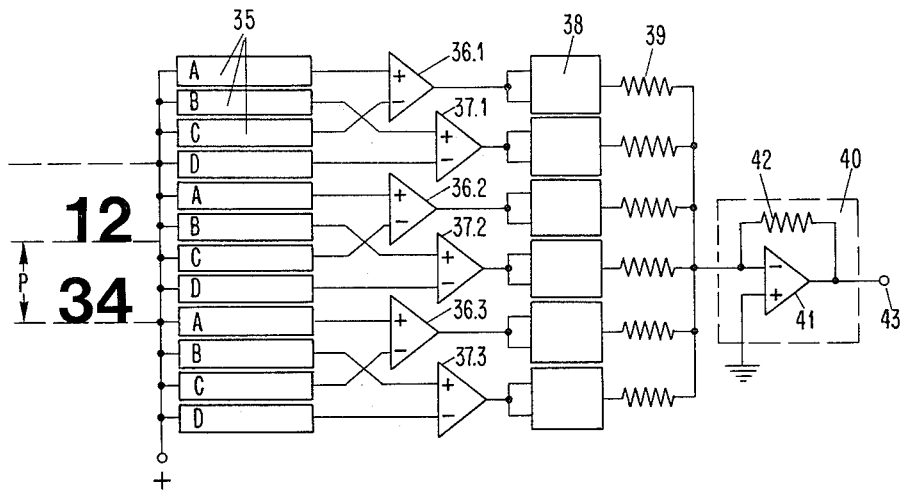
Figure 6:
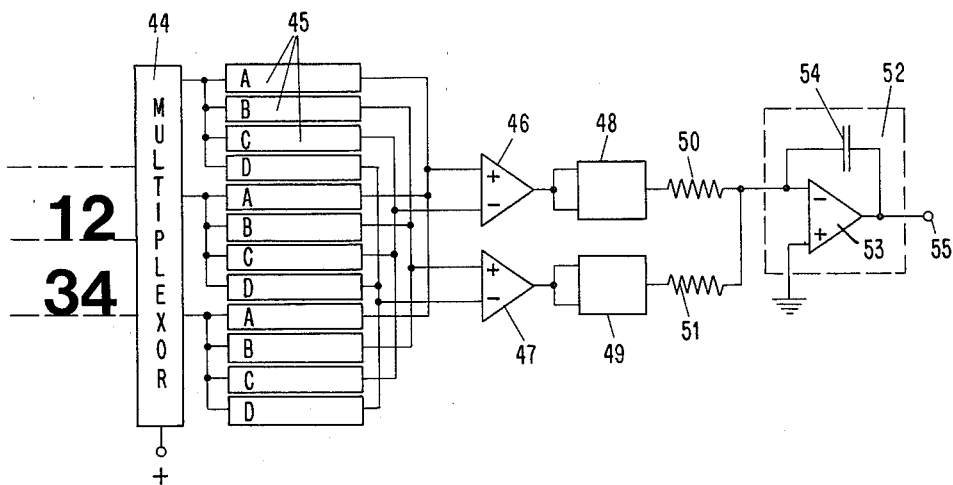

These and other objects, features and advantages of our invention will be understood by the following description of some illustrative and preferred embodiments wherein reference is made to the accompanying drawings, of which:

FIG. 1 is a schematic illustration of the opto-mechanical part of an embodiment of the present invention, FIG. 2 is a diagram of the electrical circuit utilized in the evaluation of the signals provided by the arrangement shown in FIG. 1 in accordance with the principles of the present invention, FIG. 3 is an explanatory diagram illustrating how a sensor, employed in this invention, is turned relative to a document in order to determine the optimum scan angle, FIG. 4 is an explanatory graph showing test voltage V as a function of the turning angle of FIG. 3, FIG. 5 is an electric circuit diagram of a second embodiment of the invention, and FIG. 6 is an electric circuit diagram of a third embodiment of the invention.

The arrangement hereinafter described can be employed in connection with apparatus used to scan printed documents on which characters are arranged in lines. Normally, it is most advantageous to scan the characters either parallel or perpendicular to the direction of the lines. If, therefore, the document is fed to the scanning apparatus in an "unaligned" position, or if the lines on the documents are not horizontal, a correction of the document position relative to the direction of scan is desirable or even necessary.

The arrangement serves to determine and to store the value of the angle between the actual and the optimum line direction. This angle can then be utilized to make the position correction by turning either the document or the sensor or by optical measures, thus rendering optimum scanning feasible.

FIG. 1 schematically shows the opto-mechanical portion of an embodiment of the present invention. A document 1, having printed lines 2, is illuminated by a light source 3 and, via a lens assembly 4, has its image optically projected onto a sensor plate 5. A plurality of elongated, parallel, light sensitive transducers or stripes 6 are carried by sensor plate 5. Stripes 6 are insulated from each other and are connected at one end to an operating voltage source "+". These stripes 6 may, for example, consist of a photoconductive material, the electrical resistance of which is a function of the incident light. Stripes 6 generate electric signals which correspond to the amount of light reflected from the corresponding stripe of the document 1. These signals become available on lines 8.

In a practical embodiment, 80 transducers 6 may be placed on a sensor plate 5 having a width of 8 mm and a length of 12 mm. In the presently described first embodiment, the width of four stripes corresponds to the vertical pitch p (FIG. 2) of the document image formed on the sensor.

The sensor plate 5 is arranged parallel to and above the document plane and can be turned around an axis 7 that is perpendicular to the plane of the document. In order to determine the direction of lines 2, the sensor is rotated with the aid of a drive arrangement not shown in FIG. 1. The electric signals thereby generated by the light sensitive stripes 6 on the sensor plate are fed to an evaluation circuitry. Its output signal reaches a distinct maximum when stripes 6 and print lines 2 run in parallel, and determines the deviation of the line direction from the optimum position. The angle that corresponds to this maximum output signal is stored. The required circuits and operations will, in the following, be described in more detail with the aid of FIGS. 2, 3 and 4.

FIG. 2 shows a simplified electric circuit diagram of the circuitry used. It is restricted to the essential functional elements, i.e., for ease in understanding those elements that are not of particular basic significance in connection with the invention and which are obvious to a man skilled in the art are omitted. For example, synchronization means that may be required in certain applications are not shown.

In the embodiment shown in FIG. 2, the stripes 6 on the sensor plate 5 are consecutively designated with letters A, B, C, D, A, B, etc, thus forming groups A, B, C, D, etc. The lines 8 connected to stripes 6 of each group, i.e., that carry the same letter, are interconnected. Then, via line 9A, all stripes A are connected to the first input of an operational amplifier 10. All stripes C are connected to the second input of this amplifier via line 9C. In the same manner, stripes B and D are linked, via lines 9B and 9D, with a second operational amplifier 11. The operational amplifiers 10 and 11 form output voltages porportional to the differences of the signals received at the respective inputs. These difference signals are fed to arithmetic circuits 12 and 13, respectively, where, in the described embodiment, the difference signals are squared.

The output currents of the squaring circuits are, via resistors 14 and 15, respectively, fed to input terminal 16 of a summing amplifier 17 which is formed in a well known manner, by an operational amplifier 18 and a feedback resistor 19.

As will be apparent from the following explanation of FIGS. 3 and 4, the output voltage V at terminal 20 of the summing amplifier 17 depends heavily on the relative alignment position between the sensor stripes 6 and the line direction.

FIG. 3 shows schematically a plan view of the document 1 and the sensor 5 which is arranged parallel to and above the document and is rotatable about axis 7. By means of a lens system (not shown in FIG. 3) an image of the document 1 is projected onto the sensor in a reduced scale but preserving the angles unaltered.

FIG. 4 is a diagram showing voltage V, measured at output terminal 20, as a function of the angle formed by the center line of the sensor and by the center line of the subsequently used scanning apparatus shown herein by its reference center line 32. As shown in FIG. 3, the major axis 31 of the document 1 and the reference center line 32 of the scanning apparatus form the angle $\phi$ whereas the major axis of the sensor 5 in its mid-position, indicated by solid lines, runs parallel to the center line 32.

The main purpose of the arrangement is to determine the angle $\phi$. With the arrangement shown in FIG. 1 and 2, this is accomplished as follows: Initially the sensor 5 is brought into position 5A illustrated by dotted lines in FIG. 3. The major axis of the sensor takes the position designated 33 forming the angle $+\alpha$ with the reference center line 32. Then, the sensor is turned clockwise by the angle $2\alpha$ into dotted position 5B in which the major axis of the sensor takes the position designated 34 forming the angle $-\alpha$ with the center line 32. The resulting test voltage V, terminal 20, follows the curve illustrated in FIG. 4: a distinct voltage maximum is obtained when the sensor stripes 6 run parallel to the direction of lines 2. Provided the lines 2 on the document are horizontal, i.e., perpendicular to the major axis of the document, the major axis of the sensor is at the same time parallel to the major axis 31 of the document 1. In the remaining zone $+\alpha$ through $-\alpha$, with $\alpha$ chosen to be equal to 20°, the voltage is very low. Secondary maxima are below 5% of the maximum value. The distinct voltage maximum renders it possible to determine the angle $\phi$ with an accuracy of $\pm 0.2°$.

Read-out circuitry shown in the bottom part of FIG. 2 is utilized to determine and to store the angle $\alpha$ at which the signal or test voltage V, measured at output terminal 20, reaches its maximum when the sensor 5 is turned as explained above. Terminal 20 is connected via a diode to a comparator 21 which provides a positive output signal as long as the input voltage V increases. For this purpose, the input signal is fed through a resistor 22 to a condenser 23, the other terminal of which is grounded. Whenever the voltage V exceeds every previously reached value, the condenser is charged and the charging current produces a voltage drop at the resistor. The output of an operational amplifier 24 that is arranged in parallel to resistor 22 remains positive as long as condenser 23 is charged.

A register 25 comprises a plurality of stages for the storage of binary values. These values can be written into the register via lines 26 and read out via lines 27. The output voltage of comparator 21 controls the write operation of the binary signals arriving over line 26. These signals are written into the register 25 when a positive voltage is applied to input gate 28.

Lines 26 are connected to an angle indicator 29 which, in synchronism with the turning of the sensor 5 around axis 7, continuously generates digital electrical signals that are indicative of the angle between the major axis of the sensor and the center line 32 (FIG. 3). The turning of the sensor is accomplished by means of a drive arrangement 30.

When turning the sensor from position 5A to position 5B, initially angle value $+\alpha$ will be transmitted over lines 26. In accordance with the scheme illustrated in FIG. 3, the values will then decline until they reach the value $-\alpha$. These angle values are continuously written into register 25 until the maximum voltage V is reached at angle $\phi$. The angle value that is stored at this point in time remains in register 25, since the positive potential at input 28 disappears with decreasing voltage V. The digital angle values subsequently applied via input lines 26 to the register, have no influence on the stored value.

After completion of the sweep, the looked-for angle value $\phi$ is stored in register 25. It can be read out over lines 27 and may be utilized, for example, to correct the position of the document or of the sensor such that the scanning or reading operation can take place under the optimum angle.

In the above described embodiment, a fixed relation between the pitch p of the document image on the sensor and the width of the sensor stripes had been assumed. As mentioned, the width of four stripes corresponds to the line distance or vertical pitch p. With this restriction, the possibilities of applying the inventive arrangement are relatively limited since a correction or an adjustment would become necessary each time documents of different or even unknown line distance are to be processed.

It has, however, been proven that the number of stripes per line does not necessarily have to be equal to four or to any other integer. The characteristic voltage behavior shown in FIG. 4, exhibiting a distinct maximum, can also be obtained with other stripe-pitch relations.

The circuitry shown in FIG. 5 may be, e.g., in connection with the opto-mechanical arrangement shown in FIG. 1, used for documents of practically any line distance. The circuitry of FIG. 5 largely corresponds to that illustrated in FIG. 2, however, the stripes 35 designated with the same letter are not interconnected. On the other hand, a pair of operational amplifiers 36.1 and 37.1, 36.2 and 37.2, and 36.3 and 37.3, respectively, is provided for each stripe-quadruple A,B,C,D. The outputs of these operational amplifiers are, like in the arrangement shown in FIG. 2, fed via associated squaring circuits 38 and resistors 39 to the input of a summing amplifier 40 which, again, consists of an operational amplifier 41 and a feed-back resistor 42.

When the sensor is turned relative to the document from $+\alpha$ to $-\alpha$, as explained in detail in connection with the first embodiment, the voltage V at the output terminal 43 shows essentially the same characteristic as that shown in FIG. 4. For the determination and storage of the angle $\phi$ the circuitry shown in the bottom part of FIG. 2, where it is connected with output terminal 20, can be utilized. It is to be connected with terminal 43.

A further embodiment of the inventive arrangement is illustrated in FIG. 6, again not requiring a defined relation of the stripe-line distance dimensions. The stripes 45 designated with the same letters are interconnected and, similarly as in FIG. 2, linked to a single pair of operational amplifiers 46 and 47. The required operational voltage "+" is applied to the stripe-quadruples A,B,C,D in a time-sequential fashion via multiplexor 44. The pair of operational amplifiers 46 and 47, as well as the squaring circuits 48 and 49 and the resistors 50 and 51, are consecutively used by all stripe-quadruples. The summing amplifier 17 shown in FIG. 2 is replaced by an integrator 52, consisting of an operational amplifier 53 and a feed-back condenser 54.

When turning the sensor, the resulting output voltage at terminal 55 again shows the characteristic curve illustrated in FIG. 4. The circuitry described in connection with FIG. 2 can again be used for the determination and storage of the angle $\phi$. It is to be connected with terminal 55.

For the purpose of clarity, some essential features of the invention that are common to all embodiments will, in general terms, once more be emphasized in the following:

Firstly, pairs of sensor stripes 6 are connected to the inputs of circuits, the output of which corresponds to the difference of the input signals. The pairs are, in general terms, formed by stripes $S_i$ and $S_{i+D}$ whereby, in the described embodiments, D has been equal to 2. It may, however, be a different integer.

Secondly, the difference signals are applied to arithmetic circuits that perform, again in general terms, the following function:

$$f(\Delta_j) = c_0 + c_1|\Delta_j| + c_2|\Delta_j|^2 + c_3|\Delta_j|^3 + c_4|\Delta_j|^4 + \quad (1)$$

or $$f(\Delta_j) = \sum_{K=0}^{N} c_K |\Delta_j^K| \quad (2)$$

with $c_K$ being a predetermined constant. In the examples above described, squaring circuits (12, 13; 38; 48, 49) have been employed whereby equation (2) is reduced to $$f(\Delta_j) = c_2|\Delta_j|^2 \quad (3)$$

Other, including more complicated functions may be chosen without departing from the basic concept and spirit of the invention.

Finally, all function values $f(\Delta_j)$ are summed or integrated in accumulator circuits (17; 40; 52).

Having thus described our invention, what we claim as new, and desire to secure by Letters Patent is:

1. Apparatus for determining the angle that a document bearing parallel lines of printing is out of predetermined orientation with an angular reference, wherein the improvement comprises:

sensor means including a plurality of elongated parallel transducers for generating signals corresponding to the light incident thereon, means for projecting an image of a substantial portion of a plurality of lines of the document onto said sensing means, turning means for rotating one of said document image and said sensor with respect to said reference, means for measuring the difference in the signals generated by non-adjacent ones of said transducers to produce a plurality of difference signals, means summing a function of said difference signals to produce a test value, and read-out means responsive to the occurrence of said test value reaching a maximum during said rotation for storing an indication of the position of said turning means at such occurrence with respect to said reference.

2. Apparatus as defined in claim 1 wherein the function of said difference signals comprises $$f(\Delta_j) = \sum_{K=0}^{N} c_K |\Delta_j^K|$$

wherein $\Delta_j$ is the difference signal and $N$ and $c_K$ are predetermined constants.

3. Apparatus as defined in claim 1 wherein said readout means comprises:
  indicating means operably connected to said turning means for producing signal indicative of the angle between said turning means and said reference,
  storage means including a gate connected for receiving signals from said indicating means under the control of said gate, and
  comparison circuit means connected to receive said test value from said summing means for controlling said gate to enable reception of said angle indicating signal by said storage means only so long as the test value received exceeds every previously received test value.

4. The apparatus defined in claim 1 wherein said function of said difference signals comprises the square of the difference signals.

5. Apparatus as defined in claim 1 wherein said transducers are divided into n groups with the transducers of each group being electrically interconnected to produce a single output and wherein each adjacent group of n transducers contains one member of each of said n groups.

6. Apparatus as defined in claim 1 further comprising multiplexing means for sequentially addressing selected one of said transducers and wherein said summing means comprises integrating means for accumulating the sums produced sequentially by said multiplexing means.

* * * * *